Patented Mar. 16, 1926.

1,576,558

UNITED STATES PATENT OFFICE.

RAY T. STULL, OF COLUMBUS, OHIO, ASSIGNOR TO STULL PROCESS COMPANY, OF SAVANNAH, GEORGIA, A CORPORATION OF GEORGIA.

CERAMIC MATERIAL.

No Drawing.      Application filed March 20, 1924. Serial No. 700,714.

*To all whom it may concern:*

Be it known that I, RAY T. STULL, a citizen of the United States, residing at Columbus, in the county of Franklin, and State of Ohio, have invented a new and useful Ceramic Material, of which the following is a specification.

This application is a substitute for, and in large part a continuation of, my prior application Serial No. 630,905, filed April 9, 1923; and is primarily based on such prior application, although it embodies some changes which experience has shown to be desirable.

In manufacturing face bricks, it has always been necessary heretofore to find suitable clays, containing certain necessary fluxes, in order that the clay would burn to the proper condition—dense to vitrified—with a desirable surface texture; and in addition to find a clay which was free from undesirable coloring matter, so that the brick when burned would be of the desired color or lack of color, the light bricks running from white to light buff or light gray being the most desirable. Deposits of clay suitable for this are found in certain areas, but are comparatively or totally lacking in other very extended areas. Therefore, it has heretofore been considered economically necessary that the industries manufacturing high-grade face bricks, or similar products such as tiles and blocks of various kinds, suitable for facing walls to produce architectural effects, should be located in localities where such clays are naturally found; which has made the price of face bricks in many areas exceedingly high, because of the freight charges.

There are large areas in this country, particularly through the South, where no clays have been found (and where the known geology indicates that no clays are likely to be found) which are directly suitable for the making of face bricks of the better grades and lighter colors above referred to.

Yet throughout this territory, and especially in the coastal plain of the States of Georgia, Florida, South Carolina, and Alabama, there are large, numerous, and wide-spread deposits of kaolins; which are mostly if not wholly secondary kaolins. These are nearly white, but for the main part they are not white enough or fine enough in grade to be of commercial value as filler clays, such as are used for paper fillers and oil-cloth fillers, and other filler purposes, and they do not possess the physical properties essential for pottery making. They are not directly suitable for face bricks, blocks, or tiles, because by reason of their lack of the necessary fluxes it is necessary in order to burn them that they be heated to temperatures around 3000° F., or higher, which are too high to be obtained economically, and because even when they are burned the resultant bricks warp and crack so badly that the bricks are of no value as face bricks. Therefore, these deposits have in general been considered of substantially no value, save for fire bricks, and have been considered incapable of being used for the finer grades of brick.

Further, in the Piedmont Plateau bordering this coastal plain through South Carolina, Georgia, and Alabama, there are large deposits of aplites and pegmatites containing less than two per cent (2%) of ferric oxide, and in many cases containing less than one per cent (1%) of ferric oxide; which is the main coloring matter which gives a color undesirable for the finer grades of bricks. These aplites and pegmatites, which are both igneous rocks are comparatively high in fluxes; mainly the alkalis potash and soda, with lesser amounts of the alkaline earths lime and magnesia. They are composed almost wholly of a mixture or aggregate of different kinds of feldspar and quartz; and the feldspars are principally orthoclase, albite, anorthite, and microcline. Some deposits show occasional fine flakes of mica; though the proportion of mica is very small, and must be small if these rocks are to be used for making bricks as my present invention contemplates. The aplites are the more finely grained of the general class of pegmatites; and they have certain advantages over other pegmatites in the practice of my invention, so that I prefer the aplites, but include them under the more generic term pegmatites. These pegmatites, including aplites, have been considered as substantially without value.

In addition, in this same territory, especially in the coastal plain in thick beds near the clays mentioned, there are large beds of white sand, not pure enough for use in making glass, because it contains white kaolin and occasional mica flakes with perhaps 0.6% to 1.0% of ferric oxide; so that this sand has also been considered substantially valueless.

It is the object of my invention to make it possible to produce face bricks economically where it has not heretofore been possible to do so; and to find a more advantageous use for the kaolin deposits such as those found in such coastal plain, and a beneficial use for aplites and pegmatites such as those found on the Piedmont Plateau, and a use for the large beds of sand mentioned.

Such kaolin deposits as those found in the coastal plain of South Carolina, Georgia, Alabama, and Florida are relatively pure kaolins, with substantially no soda, potash, lime, or magnesia, or only very small proportions thereof. Thus these kaolin deposits are deficient in the alkali and alkaline earth fluxes which are necessary for a brick clay—by which I mean that they have less than 1½%, say, of alkali and alkaline earth fluxes. They also have a relatively small proportion of ferric oxide, sufficiently small so that it does not produce too great discoloration for the manufacture by my invention of face bricks of a substantially white or cream to a light buff or a light gray color. An analysis of one specimen of such kaolins—and a quite typical one—is as follows:

|   | Per cent. |
|---|---|
| Moisture (upon drying at 105° C.) | 1.15 |
| Ignition loss (chemical water) | 13.33 |
| Silica ($SiO_2$) | 46.56 |
| Alumina ($Al_2O_3$) | 35.51 |
| Ferric oxide ($Fe_2O_3$) | 1.59 |
| Titanium oxide ($TiO_2$) | 1.29 |
| Phosphorous pentoxide ($P_2O_5$) | 0.05 |
| Lime (CaO) | 0.39 |
| Magnesia (MgO) | 0.25 |
| Soda ($Na_2O$) | 0.00 |
| Potash ($K_2O$) | 0.00 |
| Sulphur (S) | 0.03 |
| Total | 100.15 |

The aplite and pegmatite rocks such as those found on the Piedmont Plateau have varying compositions, mainly of mixed feldspars and quartz, and include the very fluxes which the aforesaid kaolins lack. The relative percentages of feldspar to quartz in those aplites and pegmatites mainly vary from about 70% feldspars and 30% quartz to about 40% feldspars and 60% quartz; or at least those within that range are suitable for my purpose, though some of the rocks found come outside of this range.

The chemical analysis of these rocks varies with different specimens, but two fairly typical sample analyses actually made of aplites are as follows:—

|   | No. 1 | No. 2 |
|---|---|---|
|   | Per cent | Per cent |
| Moisture (upon drying at 105° C.) | 0.02 | 0.40 |
| Ignition loss | 0.44 | 1.62 |
| Silica ($SiO_2$) | 84.00 | 73.30 |
| Alumina ($Al_2O_3$) | 8.93 | 15.00 |
| Ferric oxide ($Fe_2O_3$) | 0.50 | 1.51 |
| Titanium oxide ($TiO_2$) | 0.02 | 0.17 |
| Phosphorous pentoxide ($P_2O_5$) | 0.02 | 0.01 |
| Lime (CaO) | 0.54 | 0.82 |
| Magnesia (MgO) | 0.11 | 0.95 |
| Potash ($K_2O$) | 3.13 | 4.13 |
| Soda ($Na_2O$) | 2.66 | 3.37 |
| Total | 100.37 | 100.38 |

Analysis No. 1 is of a good hard non-weathered aplite, while analysis No. 2 is of an aplite which had weathered slightly.

From these chemical analyses, empirical formulas of these aplites may be derived somewhat as follows:

*No. 1.*

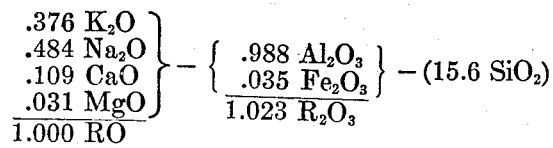

*No. 2.*

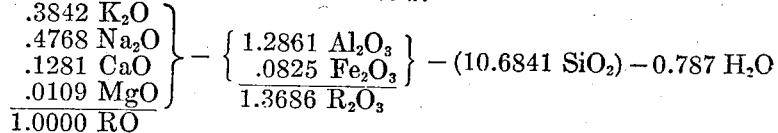

The above empirical formula of the No. 1 aplite sample, which was practically unweathered, when thus arranged to add up to one molecule of the oxides of the alkalis and alkaline earths (RO), also adds up very closely and within the errors of observation to one molecule of aluminum oxide ($Al_2O_3$), (the ferric oxide is probably an impurity,) and to the six molecules of silica necessary for the formation of the feldspars, with an admixed amount of about 9.6 molecules of probably uncombined or free silica, which last probably appears as quartz.

The above empirical formula for the No. 2 aplite sample, which was slightly weathered and in consequence partially "kaolinized", when similarly arranged to add up to one molecule of the oxides of the alkalis and alkaline earths (RO), shows more than one molecule of aluminum oxide ($Al_2O_3$), with a less amount (4.68 molecules) of excess silica additional to the six molecules of silica in the feldspars. This excess alumina and part of this excess silica probably occur in combination as kaolinite, and the remaining silica is probably uncombined as free silica. There is also some water due to the kaolinization, the "ignition loss" shown by the analysis indicating that the water is mostly chemical water driven off from the kaolinite content.

This agrees with the microscopic analyses. Both the chemical and microscopic analyses indicate that the aggregate is composed largely of the potash feldspar known as orthoclase, the soda feldspar known as albite, the calcium feldspar (probably with magnesium) known as anorthite, and free silica as quartz; with some kaolinite showing in the slightly weathered No. 2 specimen. The iron, titania, and phosphorous pentoxide are evidently present as impurities.

For the particular aplites for which the analyses are given above, the ratio between total feldspars and quartz, by weight, is substantially as follows:

No. 1.

| | Per cent. |
|---|---|
| Total feldspars | 48.14 |
| Quartz | 51.86 |

No. 2.

| | Per cent. |
|---|---|
| Total feldspars | 62.54 |
| Quartz | 28.83 |
| Kaolinite | 8.63 |

This ratio between feldspars and quartz, however, varies markedly with specimens from different localities.

Material of the nature of these aplite rocks will fuse or "flux" to a porcelain-like translucent glass at temperatures from 2300° F. to 2400° F., depending upon the variation in the relative proportions of the feldspars and the quartz, and the nature of the feldspars. These aplites and pegmatites are not used for pottery or glaze-making purposes, because they are neither sufficiently pure nor sufficiently uniform; as for those purposes an orthoclase feldspar of as high a degree of purity as it is possible to get is desired.

According to my invention, these geographically adjacent deposits of heretofore nearly valueless kaolins and heretofore substantially valueless aplites and pegmatites are given a distinct and relatively high value. By my invention, these separated but adjacent deposits are put together in a simple way to make a composition which is most suitable for the making of face bricks of a high value—face bricks which are more nearly white than any previous face bricks of which I am aware. Further, the face bricks made by my invention are not only of a desirable color, but are of a desirable surface texture; and they are strong and substantially free from internal strains, so that they will stand up in use, will be hard, dense, and vitrified at temperatures commercially and economically attainable in a practically working ceramic kiln, and will be free from the warping and cracking which has heretofore accompanied all attempted use of these kaolins for bricks.

By my invention, I mix these substantially fluxless kaolins with these pegmatites, most desirably the aplites, in varying proportions, to produce a suitable synthetic clay which is eminently suitable for high-grade face bricks, and similar objects, and I make brick and tiles from this synthetic clay. This can be done at comparatively small expense, and in many localities, because both these aplites and pegmatites and these fluxless kaolins are quite widespread, and are found fairly close together in many places.

The aplites or pegmatites and the relatively fluxless kaolin or clay may be mixed in any desirable proportions. They may be ground or crushed separately, and then mixed; or they may be mixed first, and then ground or crushed together. I prefer to grind the aplite or pegmatite separately, and then to mix with it the clay (and sand when sand is used) in unground form in a pug mill. In this way, the ingredients are sufficiently finely subdivided by the time the mixing and grinding are complete, so that in their final mixture the ingredients will be intimately mixed. In any case, the grinding and the mixing are done with the ingredients in a dry or comparatively dry condition, with only sufficient water added where necessary to mold the mixture into desirable shapes—enough for "kneading", or "pugging", or "tempering" to the proper consistency for molding. This is different from the wet process of grinding and mixing, with the materials in the form of a relatively thin slip, such as is used in making mixtures for porcelain manufacture, and obviates the expensive and slow wet process with its necessary blunging, screening, and filter-pressing. When the synthetic clay thus made by these mixed materials has been sufficiently ground and mixed; and moistened sufficiently so that it will hold its shape when molded, it is molded, dried, and fired in the usual way of brick and tiles. These brick and tiles have the characteristics indicated above as desirable for facing work.

This firing may be done at a temperature of from 2000° F. to 2650° F., depending upon the quality and coloring of the brick wanted, and on the proportions of the substantially fluxless kaolin and the flux-containing rocks used for the mixture. By increasing the proportion of these rocks, the fluxing temperature may be reduced. I prefer mixtures ranging from 40% to 60% of the substantially fluxless clay or kaolin with 60% to 40% of aplites or pegmatites; but it is possible to make quite desirable bricks outside of these ranges, from as low as 10% of aplite or pegmatite up to about 80% thereof, with the bulk of the balance of the mixture of the substantially fluxless clay or kaolin. In any case, I prefer to add enough of the aplite or pegmatite to produce in the mixture an amount of the alkali and alkaline earth oxides above 1½%, and desirably above 3% and to lower the fluxing temperature of the mixture below 2650° F.

By reason of the average lesser proportion of ferric oxide in the pegmatite or aplite than in the kaolin, the total percent of ferric oxide in the synthetic clay mixture is less than that of the original kaolin, and may be kept below 2¼%, and often below 1%, in the final synthetic clay mixture. By reason of this small proportion of ferric oxide, I am able to avoid almost wholly the red coloration which such ferric oxide makes in bricks, and even to avoid it wholly by proper burning.

Further, in order to make a desirable synthetic clay from the substantially fluxless kaolins referred to, I may augment the effect of the aplite or pegmatite and make up for any lacks therein, by adding certain other materials to the mixture and mixing them intimately therewith, preferably in the same dry process. For instance, if the aplite or pegmatite has small proportions of the alkaline earth fluxes, such as lime and magnesia, as is sometimes the case, I may add to the mixture some suitable alkaline-earth material, such as comparatively iron-free lime-bearing material to increase the lime content. For this lime-bearing material, I may use limestone, marl, chalk, dolomite, or other suitable and inexpensive calcareous material; or even the cheaper grades of marble, for some marbles are sufficiently inexpensive for this. I may also supply this deficiency by some barium-bearing material, such as barium carbonate or barium chloride; the barium also functions to prevent scumming and discoloration. I prefer to add enough of such material to raise the content of alkaline earth oxides in the synthetic clay to above 0.5%. Likewise, if the fluxing rock has small proportions of alkali fluxes I may add a suitable alkali-bearing material, such as common salt; which has the additional function of reducing the amount of water required for plasticity, thereby reducing shrinkage and the tendency to crack.

Similarly, if the aplite or pegmatite has relatively high proportions of total feldspars and low proportions of free silica, I may augment the lack of silica by the addition of comparatively pure silica sand, quartz, ganister, flint, chert, or similar source of silica, preferably in a finely ground condition when used primarily for this purpose. I prefer to add sufficient silica, when necessary, to produce proportions of about 50% feldspar to 50% silica, by weight; though this proportion is merely desirable, and may be departed from rather widely. In any case, there should be at least 30% silica to 70% feldspar for a desirable fluxing effect, and therefore it is desirable to add at least enough silica when necessary to get this percentage of silica to feldspar. Such added material to make up for a lack in the aplite or pegmatite may be ground separately and then intimately mixed with the other ingredients; or may be mixed therewith in desired proportions and the whole ground together; but when sand is used it need not be ground at all, ordinarily, as it and the kaolin, both unground, may simply be mixed in a pugging machine with the ground aplite or pegmatite, which is the way I now prefer because it is the least expensive in time, labor, and equipment.

Usually it is desirable to control and reduce the shrinkage which occurs on burning. Kaolin has a marked shrinkage on burning. Aplite or pegmatite has no true shrinkage, but has an apparent shrinkage in powdered form. A mixture of clay and aplite or pegmatite often has too great shrinkage. To control and reduce this shrinkage, I prefer to add coarse silica sand to the ground mixture of kaolin with aplite or pegmatite. The sand beds which are in close proximity to the clay beds on the aforesaid coastal plain are conveniently and cheaply available; for such sand is suitable for this. This added sand undoubtedly plays a part in the chemical interaction within the mixture, by raising the relative amount of silica as already explained; but when added in coarse form it acts primarily to control and reduce shrinking. This is probably because the silica of the sand when sufficiently heated changes its crystalline form, with an accompanying increase in volume. Therefore, by adding suitable amounts of coarse silica sand I can get within limits any desired control of and reduction in the shrinkage.

By my invention, I am able to make face bricks in localities where it was previously considered impossible; and I am able to use materials heretofore considered of little or no value and deemed wholly unsuitable for such face bricks; and I obtain face bricks and similar articles of a grade as high as, and in many cases higher than, any face brick of which I have ever known that were obtained directly from natural clays.

I claim as my invention:—

1. As a composition of matter, a synthetic clay suitable for making light-colored brick composed of a mixture of natural highly colloidal secondary kaolin deficient in alkali and alkaline earth fluxes, with a pegmatite.

2. As a composition of matter, a synthetic clay suitable for making light-colored face brick composed of a mixture of natural highly colloidal secondary kaolin deficient in alkali and alkaline earth fluxes, with an aplite.

3. As a composition of matter, a synthetic clay suitable for making light-colored brick composed of a mixture of natural highly colloidal secondary kaolin deficient in alkali and alkaline earth fluxes, with an aplite, both said kaolin and said aplite being sufficiently low in ferric oxide so that in the mixture the ferric oxide does not exceed 2¼%.

4. As a composition of matter, a synthetic clay suitable for making light-colored brick composed of a mixture of natural highly colloidal secondary kaolin deficient in alkali and alkaline earth fluxes, with an aplite, both said kaolin and said aplite being sufficiently low in ferric oxide that any dark discoloration of bricks made from such synthetic clay is avoided.

5. As a composition of matter, a synthetic clay suitable for making light-colored brick composed of a mixture of natural highly colloidal secondary kaolin deficient in alkali and alkaline earth fluxes, with an aplite, and with enough added silica to raise the proportion of silica to feldspar above 30% silica.

6. As a composition of matter, a synthetic clay suitable for making light-colored brick composed of a mixture of natural highly colloidal secondary kaolin deficient in alkali and alkaline earth fluxes, with an aplite, and with enough added calcareous material to raise the content of alkaline earth oxides in the mixture above 0.5%.

7. As a composition of matter, a synthetic clay suitable for making light-colored brick composed of a mixture of natural highly colloidal secondary kaolin deficient in alkali and alkaline earth fluxes, with an aplite in sufficient amount to raise the total alkali and alkaline earth oxides above 1½% in the mixture.

8. As a composition of matter, a synthetic clay suitable for making light-colored brick composed of a mixture of natural highly colloidal secondary kaolin deficient in alkali and alkaline earth fluxes, with an aplite in sufficient amount to reduce the fluxing temperature of the mixture to below 2650° F.

9. As a composition of matter, a synthetic clay suitable for making light-colored brick composed of a mixture of natural highly colloidal secondary kaolin deficient in alkali and alkaline earth fluxes, with an aplite, and with enough added silica and enough added calcareous material to raise the proportion of silica to feldspar above 30% silica and to raise the content of alkaline earth oxides in the mixture above 0.5%.

10. As a composition of matter, a synthetic clay suitable for making light-colored brick composed of a mixture of natural highly colloidal secondary kaolin deficient in alkali and alkaline earth fluxes, with a sufficient quantity of a pegmatite containing such fluxes to raise the content of such fluxes in the mixture above 1½%.

11. As a composition of matter, a synthetic clay suitable for making light-colored brick composed of a mixture of natural highly colloidal secondary kaolin deficient in alkali and alkaline earth fluxes, with a pegmatite containing such fluxes, both said kaolin and said pegmatite being sufficiently low in ferric oxide so that in the mixture the ferric oxide does not exceed 2¼%.

12. As a composition of matter, a synthetic clay suitable for making light-colored brick composed of a mixture of natural highly colloidal secondary kaolin deficient in alkali and alkaline earth fluxes, with an aplite, and with added silica to raise the proportion of silica to feldspar.

13. As a composition of matter, a synthetic clay suitable for making light-colored brick composed of a mixture of natural highly colloidal secondary kaolin deficient in alkali and alkaline earth fluxes, with an aplite, and with added calcareous material to raise the content of alkaline earth oxides in the mixture.

14. As a composition of matter, a synthetic clay suitable for making light-colored brick composed of a mixture of natural highly colloidal secondary kaolin deficient in alkali and alkaline earth fluxes, with an aplite, and with added sand to reduce the shrinkage.

15. As a composition of matter, a synthetic clay suitable for making light-colored brick composed of a mixture of natural highly colloidal secondary kaolin deficient in alkali and alkaline earth fluxes, with a pegmatite containing such fluxes, and with added calcareous material to raise the content of alkaline earth oxides in the mixture.

16. As a composition of matter, a synthetic clay suitable for making light-colored brick composed of a mixture of natural highly colloidal secondary kaolin deficient in alkali and alkaline earth fluxes, with an igneous rock containing mixed feldspar and quartz.

17. As a composition of matter, a synthetic clay suitable for making light-colored brick composed of a mixture of natural highly colloidal secondary kaolin deficient in alkali and alkaline earth fluxes, with an igneous rock containing mixed feldspar and quartz, both said kaolin and said igneous rock being sufficiently low in ferric oxide so that in the mixture the ferric oxide does not exceed two and one-fourth per cent (2¼%).

18. As a composition of matter, a synthetic clay suitable for making light-colored brick composed of a mixture of natural highly colloidal secondary kaolin deficient in alkali and alkaline earth fluxes, with an igneous rock containing mixed feldspar and quartz, and with enough added silica to raise the proportion of silica to feldspar above 30% silica.

19. As a composition of matter, a synthetic clay suitable for making light-colored brick composed of a mixture of natural highly colloidal secondary kaolin deficient in alkali and alkaline earth fluxes, with an igneous rock containing mixed feldspar and quartz, and with enough added calcareous material to raise the content of alkaline earth oxides in the mixture above 0.5%.

20. As a composition of matter, a synthetic clay suitable for making light-colored brick composed of a mixture of natural highly colloidal secondary kaolin deficient in alkali and alkaline earth fluxes, with an igneous rock containing mixed feldspar and quartz in sufficient amount to raise the total alkali and alkaline earth oxides above 1½% in the mixture.

21. As a composition of matter, a synthetic clay suitable for making light-colored brick composed of a mixture of natural highly colloidal secondary kaolin deficient in alkali and alkaline earth fluxes, with an igneous rock containing mixed feldspar and quartz in sufficient amount to reduce the fluxing temperature of the mixture to below 2650° F.

22. The process of making light-colored bricks, consisting in making a synthetic clay by intimately mixing dry a natural highly colloidal secondary kaolin deficient in alkali and alkaline earth fluxes, with an igneous rock containing mixed feldspar and silica, and finely subdividing the ingredients of said mixture, as by grinding, by the time the mixing and grinding operations are complete; forming bricks of such synthetic clay; and burning the bricks so formed.

23. The process of making light-colored bricks, consisting in making a synthetic clay by intimately mixing dry a natural highly colloidal secondary kaolin deficient in alkali and alkaline earth fluxes, with an igneous rock containing mixed feldspar and silica, and finely subdividing the ingredients of said mixture, as by grinding, by the time the mixing and grinding operations are complete, both said kaolin and said igneous rock being sufficiently low in ferric oxide so that in the mixture the ferric oxide does not exceed 2¼%; forming bricks of such synthetic clay, and burning the bricks so formed.

24. The process of making light-colored bricks, consisting in making a synthetic clay by intimately mixing dry a natural highly colloidal secondary kaolin deficient in alkali and alkaline earth fluxes, with an igneous rock containing mixed feldspar and silica, with enough added silica to raise the proportion of silica to feldspar above 30% silica, and finely subdividing the ingredients of said mixture, as by grinding, by the time the mixing and grinding operations are complete; forming bricks of such synthetic clay; and burning the bricks so formed.

25. The process of making light-colored bricks, consisting in making a synthetic clay by intimately mixing dry a natural highly colloidal secondary kaolin deficient in alkali and alkaline earth fluxes, with an igneous rock containing mixed feldspar and silica, with enough added calcareous material to raise the content of alkali earth oxides in the mixture above 0.5%, and finely subdividing the ingredients of said mixture, as by grinding, by the time the mixing and grinding operations are complete; forming bricks of such synthetic clay; and burning the bricks so formed.

26. The process of making light-colored bricks, consisting in making a synthetic clay by intimately mixing dry a natural highly colloidal secondary kaolin deficient in alkali and alkaline earth fluxes, with an igneous rock containing mixed feldspar and silica, and finely subdividing the ingredients of said mixture, as by grinding, by the time the mixing and grinding operations are complete, and having such igneous rock present in sufficient amount to raise the total alkali and alkaline earth oxides above 1½% in the mixture; forming bricks of such synthetic clay; and burning the bricks so formed.

27. The process of making light-colored bricks, consisting in making a synthetic clay by intimately mixing dry a natural highly colloidal secondary kaolin deficient in alkali and alkaline earth fluxes, with an igneous rock containing mixed feldspar and silica, and finely subdividing the ingredients of said mixture, as by grinding, by the time the mixing and grinding operations are complete, and having such igneous rock present in sufficient amount to reduce the fluxing temperature of the mixture to below 2650° F.; forming bricks of such synthetic clay; and burning the bricks so formed.

28. The process of making light-colored bricks, consisting in making a synthetic clay by intimately mixing dry a natural highly colloidal secondary kaolin deficient in alkali and alkaline earth fluxes, with an igneous rock containing mixed feldspar and silica and with enough added silica and enough added calcareous material to raise the proportion of silica to feldspar above 30% silica and to raise the content of alkali earth oxides in the mixture above 0.5%, and finely subdividing the ingredients of said mixture as by grinding by the time the mixing and grinding operations are complete; forming bricks of such synthetic clay; and burning the bricks so formed.

29. As a composition of matter, a synthetic clay suitable for making light-colored brick composed of a mixture of natural highly colloidal secondary kaolin deficient in alkali and alkaline earth fluxes, with an igneous rock containing mixed feldspar and quartz and with enough added silica and enough added calcareous material to raise the proportion of silica to feldspar above 30% silica and to raise the content of alkaline earth oxides in the mixture above 0.5%.

30. A face brick or tile made of the synthetic clay set forth in claim 1.

31. A face brick or tile made of the synthetic clay set forth in claim 2.

32. A face brick or tile made of the synthetic clay set forth in claim 16.

33. A face brick or tile made in accordance with the process set forth in claim 22.

In witness whereof, I have hereunto set my hand at Columbus, Ohio, this 14th day of March, A. D. one thousand nine hundred and twenty four.

RAY T. STULL.